United States Patent Office 3,058,992
Patented Oct. 16, 1962

3,058,992
INTERMEDIATES FOR THE PREPARATION OF TRYPTAMINE COMPOUNDS
André Allais and Pierre Girault, Paris, France, assignors, by mesne assignments, to Roussel-UCLAF, S.A., Paris, France, a corporation of France
No Drawing. Filed Mar. 14, 1961, Ser. No. 95,478
Claims priority, application France Jan. 8, 1958
4 Claims. (Cl. 260—319)

The present invention relates to new substituted tryptamine compounds of the general formula:

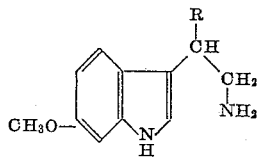

where R represents an alkyl radical selected from the group consisting of ethyl and methyl and, more particularly, to 2-(6'-methoxy-3'-indolyl)-1-propylamine and 2-(6'-methoxy-3'-indolyl)-1-butylamine, and to the acid addition salts of these compounds, and to processes of preparing the same.

It is an object of this invention to provide substituted tryptamine compounds of the general formula:

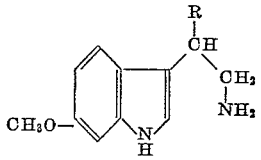

where R represents an alkyl radical selected from the group consisting of ethyl and methyl.

It is another object of the present invention to provide 2-(6'-methoxy-3'-indolyl)-1-propylamine and 2-(6'-methoxy-3'-indolyl)-1-butylamine which are useful as intermediates in the synthesis of physiologically active compounds of the reserpine series and have themselves useful pharmacodynamic properties as an anti-metabolite.

A further object of the invention is the obtention of novel intermediates, nitro compounds of the general formula:

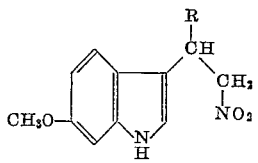

where R represents an alkyl radical selected from the group consisting of ethyl and methyl, and in particular 2-(6'-methoxy-3'-indolyl)-1-nitro-butane and 2-(6'-methoxy-3'-indolyl-1-nitro-propane.

A still further object of the invention is the obtention of 2-(6'-methoxy-3'-indolyl)-propionitrile.

Another object of the present invention is to provide simple and effective processes of producing said new substituted tryptamine compounds.

Other objects of the present invention and advantageous features thereof will become apparent as the description proceeds.

In principle, the present invention relates to the tryptamine compounds of the Formula I

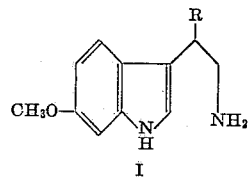

I where R represents an alkyl radical selected from the group consisting of ethyl and methyl and to their acid addition salts.

The processes of producing said substituted tryptamine compounds may be illustrated by the following reaction flow-sheets:

TABLE I

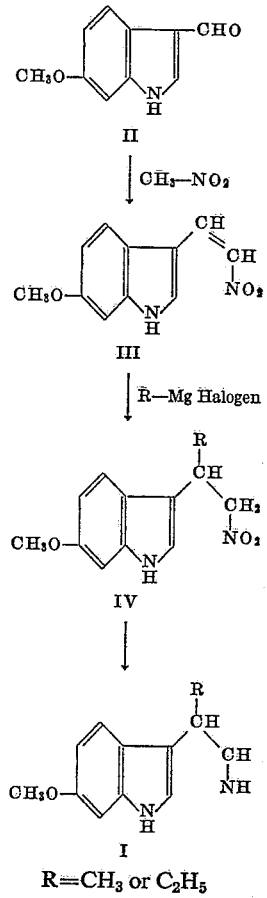

R=CH₃ or C₂H₅

TABLE II

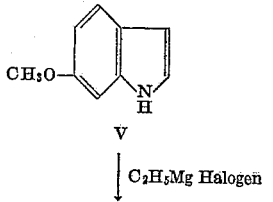

TABLE II—Continued

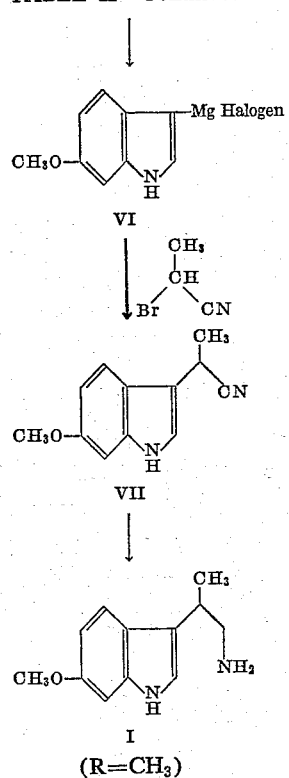

(R=CH₃)

These compounds are prepared, as shown in Table I which indicates the various reaction stages and the formulas of the intermediates obtained thereby. In principle, the process consists in reacting nitro methane with 6-methoxy-3-formyl indole of Formula II in an appropriate organic solvent and in the presence of an organic base, as, for example, in benzene containing piperidine.

The resulting reaction product, 2-(6'-methoxy-3'-indolyl)-1-nitro ethene of Formula III is isolated from the reaction mixture and is condensed with a Grignard reagent such as an ethyl magnesium halide or a methyl magnesium halide. Thereby the compound of Formula IV is obtained. The condensation is carried out in an inert anhydrous organic solvent such as tetrahydrofuran at a temperature of from about 10° C. to about 20° C.

The resulting reaction product of Formula IV is then reduced by means of a mixed metal hydride in an anhydrous inert organic solvent at elevated temperatures. Reduction with lithium aluminum hydride in tetrahydrofuran at reflux temperatures is preferred.

The amine of Formula I is purified by conversion into an insoluble acid addition salt thereof, such as the picrate or the acetate, and decomposing the latter according to conventional techniques.

According to another process, Compound I, where R=CH₃ can be prepared as shown in Table II, which indicates the various reaction stages and the formulas of the intermediates obtained thereby.

6-methoxy indole of Formula V is reacted with a Grignard reagent such as a lower alkyl magnesium halide and preferably an ethyl magnesium halide in a suitable solvent, preferably in a phenol ether such as anisole. The resulting 6-methoxy indolyl magnesium halide VI is condensed with α-bromo propionitrile at a low temperature. 2-(6'-methoxy-3'-indolyl) propionitrile of Formula VII is obtained thereby. It is extracted from the reaction mixture and purified. Reduction of said compound is carried out by means of hydrogen in the presence of a nickel catalyst and in alcoholic ammoniacal solution. Thereby, 2-(6'-methoxy-3'-indolyl)-1-propylamine of Formula I (R=CH₃) is obtained which is isolated and crystallized in the form of its slightly soluble picrate. After decomposition of the picrate by the action of an alkali metal hydroxide, the free amino compound is extracted by means of methylene chloride and is isolated from the extract.

The following examples serve to illustrate the present invention without, however, limiting the same thereto. More particularly, the nature of the reducing agent, the solvent employed, the extracting solvent, and the like may be varied by those skilled in the art in accordance with the principles set forth herein and in the claims annexed hereto.

The melting points given in the examples are instantaneous melting points determined on the Maquenne block.

Example I

PREPARATION OF 2-(6'-METHOXY-3'-INDOLYL)-1-NITRO-ETHENE OF FORMULA III 120 g. of 6-methoxy-3-formyl indole of Formula II (prepared as described by D. G. Harvey and W. Robson, "J. Chem. Soc.," vol. 1938, page 97), 5,400 cc. of benzene, 38.4 cc. of piperidine, and 83.5 g. of nitromethane are introduced into a flask provided with a condenser permitting return of the distilled benzene to the reaction mixture and removal of the water distilled thereby as azeotropic mixture with benzene.

The reaction mixture is heated to boiling under reflux for 6 hours. During this time 12 cc. of water are collected. The reaction mixture is then allowed to cool and stand overnight. The resulting precipitate is filtered off, dried at room temperature, and washed by triturating it with benzene and vacuum filtering.

After drying 128 g. of 2-(6'-methoxy-3'-indolyl)-1-nitro-ethene, Formula III, are obtained. This crude material, which has a melting point of 202° C., is purified by recrystallization from ethanol. 63.5 g. are obtained as first fraction, corresponding to a yield of 42.5%.

The 2-(6'-methoxy-3'-indolyl)-1-nitro-ethene obtained in this manner, which has not been described in the literature, forms brick red prismatic crystals. It is soluble in acetone, tetrahydrofuran, and warm alcohol, and insoluble in ether, benzene and chloroform.

Analysis.—$C_{11}H_{10}O_3N_2$; molecular weight=218.21. Calculated: C, 60.54%; H, 4.62%; O, 22.0%; N, 12.84%. Found: C, 60.5%; H, 4.9%; O, 22.3%; N, 12.8%.

Example II

PREPARATION OF 2-(6'-METHOXY-3'-INDOLYL)-1-NITRO-PROPANE (IV; R=CH₃)

50 g. of 2-(6'-methoxy-3'-indolyl)-1-nitro-ethene, III, prepared according to Example I, are dissolved in one liter of tetrahydrofuran. A solution of methyl magnesium iodide in ether, prepared by adding 150 g. of methyl iodide to 22.3 g. of magnesium, is placed in an ice bath in a nitrogen atmosphere.

The addition of the intermediate nitro compound (compound of Formula III) to the Grignard reagent is effected within one and a half hours in such a manner that the temperature is kept between 15° C. and 20° C.

The reaction mixture is then agitated for 4 hours and is treated with 1,250 cc. of a saturated solution of ammonium chloride. Agitation is continued for another 15 minutes. The aqueous phase is decanted and extracted with ether. The combined ether extracts are washed with a 5% solution of sodium bisulfite and thereafter with water.

The washed ether extracts are dried over sodium sulfate, filtered, and the filtrate is distilled in a vacuum until dry. The distillation residue consists of 50 g. (about 93% yield) of 2-(6'-methoxy-3'-indolyl)-1-nitro-propane, IV (R=CH₃). It may be used as such, without further purification, in the next reaction step. This 2-(6'-methoxy-3'-indolyl)-1-nitro-propane has not been described previously in the literature.

Example III

PREPARATION OF THE PICRATE OF 2-(6'-METHOXY-3'-INDOLYL)-1-PROPYLAMINE (I; R=CH$_3$)

50 g. of 2-(6'-methoxy-3'-indolyl)-1-nitro-propane, IV (R=CH$_3$), prepared according to Example II are dissolved in 1000 cc. of tetrahydrofuran and added to a solution containing 25 g. of lithium aluminum hydride in 750 cc. of tetrahydrofuran. During addition which requires about one and a half hours, moderate refluxing is maintained. Heating is continued for 4 hours and, after cooling, excess hydride is destroyed by adding water. The mixture is filtered and the precipitated alumina is washed with tetrahydrofuran. The wash waters are added to the filtrate which is then evaporated to dryness in a vacuum. The residue is dissolved in methylene chloride and extracted with a 5% aqueous solution of acetic acid. The acetic acid extracts are alkalized with a 5 N sodium hydroxide solution until a pH of 10.0 is achieved and the alkaline extracts are again extracted with methylene chloride. The methylene chloride extracts are dried, filtered and evaporated to dryness in a vacuum.

25 g. of the crude compound of 2-(6'-methoxy-3'-indolyl)-1-propylamine, I (R=CH$_3$), are obtained and are converted into the picrate by dissolution in 100 cc. of ethanol. The resulting solution is added to an alcoholic solution of picric acid. Thereby the picric acid salt of the indole compound of Formula I (R=CH$_3$) is precipitated. The mixture is cooled with ice for one hour, filtered, dried at room temperature and washed by triturating with ethanol and vacuum filtering.

After drying, 44.5 g. of the picrate of 2-(6'-methoxy-3'-indole)-1-propylamine, I (R=CH$_3$) of the melting point of 242° C. are obtained, corresponding to a yield of 48%. This salt has a vivid red color.

Example IV

PREPARATION OF 2-(6'-METHOXY-3'-INDOLYL)-1-NITRO-BUTANE, IV (R=C$_2$H$_5$)

An ether solution of ethyl magnesium halide is prepared from 289 g. of ethyl iodide and 39 g. of magnesium. The solution is cooled to 10° C. and 88 g. of 2-(6'-methoxy-3'-indolyl)-1-nitro-ethene, III, prepared according to Example I, and 1760 cc. of tetrahydrofuran are added thereto with stirring and under an atmosphere of nitrogen. Addition of 2-(6'-methoxy-3'-indolyl)-1-nitro-ethene to said ethyl magnesium halide is effected in such a manner as not to exceed 20° C. and requires about 1½ hours. The resulting mixture is stirred for 4 hours, whereafter 2 l. of a saturated solution of ammonium chloride are added. The mixture is again stirred for 15 minutes. The aqueous phase is decanted and extracted with ether. The organic extracts are combined and washed with water containing 5% of sodium bisulfite and thereafter with pure water. After drying over sodium sulfate and filtering the filtrate is distilled first at atmospheric pressure and then in a vacuum until dry. 100 g. of a brown gum are obtained, consisting of 2-(6'-methoxy-3'-indolyl)-1-nitrobutane, IV (R=C$_2$H$_5$). The gum is used without further purification in the following reaction step.

This product is new.

Example V

PREPARATION OF 2-(6'-METHOXY-3'-INDOLYL)-1-BUTYLAMINE PICRATE (I, R=C$_2$H$_5$)

100 g. of 2-(6'-methoxy-3'-indolyl)-1-nitro-butane, IV (R=C$_2$H$_5$), prepared according to the preceding example, in 2000 cc. of tetrahydrofuran are added very slowly to 45 g. of lithium-aluminum hydride in 1500 cc. of tetrahydrofuran. The addition takes two hours and increases the temperature of the reaction mixture to gently boiling under reflux due to the vigorous reaction taking place thereby, which causes discoloration of the nitro compound. Boiling under reflux is continued for 4 hours. After cooling, excess hydride is destroyed by the addition of water. The alumina precipitate is filtered off and washed with tetrahydrofuran. The filtrate and the wash liquors are combined and evaporated to dryness in a vacuum. The residue is dissolved in 1200 cc. of benzene. The benzene solution is extracted with a 5% aqueous acetic acid solution and the acetic acid extracts are rendered alkaline by the addition of 300 cc. of 5 N sodium hydroxide solution. The aqueous solution is then extracted with benzene and the benzene extracts are dried over potassium hydroxide pellets and evaporated to dryness in a vacuum. The residue, a brown resin, weighs 53 g. It is dissolved in 100 cc. of methanol. 55 g. of picric acid dissolved in 700 cc. of methanol are added thereto. Crystallization is initiated by scratching. The mixture is allowed to stand at room temperature for 30 minutes and is then cooled in ice for one hour. The resulting crystals are filtered off, washed with methanol, and dried. 47.5 g. of the brick red picrate of 2-(6'-methoxy-3'-indolyl)-1-butylamine, I (R=C$_2$H$_5$), are obtained; melting point: 223° C. The yield is 26% calculated for the compound of Formula IV. A second crop of 10 g. can be recovered from the mother liquors, thus bringing the total yield to 31.9% of the theoretical amount. This new compound is soluble in acetone and dimethyl formamide, slightly soluble in alcohol, and insoluble in water, benzene and chloroform.

*Analysis.*—C$_{19}$H$_{21}$O$_8$N$_5$; molecular weight=447.40. Calculated: C, 51.00%; H, 4.73%; N, 15.65%. Found: C, 50.9%; H, 4.8%; N, 15.4%.

Example VI

PREPARATION OF 2-(6'-METHOXY-3'-INDOLYL)-1-BUTYLAMINE ACETATE (I, R=C$_2$H$_5$)

2 g. of the raw amine of Formula I (R=C$_2$H$_5$), prepared according to Example V, are dissolved in 20 cc. of benzene, 0.6 cc. of acetic acid are added and the gum which is formed is triturated in the benzene. The crystals thus produced are filtered off, washed by making a paste with benzene, and dried under vacuum. 2.3 g. of the acetate of 2-(6'-methoxy-3'-indolyl)-1-butylamine, I (R=C$_2$H$_5$), are obtained; melting point: 160–165° C. Yield: 90% of the theoretical yield. For purposes of analysis the acetate is recrystallized from ethyl acetate whereby, however, the melting point is not changed.

*Analysis.*—C$_{15}$H$_{22}$O$_3$N$_2$; molecular weight=278.35. Calculated: C, 64.73%; H, 7.96%; O, 17.24%; N, 10.07%. Found: C, 64.9%; H, 7.9%; O, 17.3%; N, 10.1%.

This new compound is obtained in the form of white prismatic crystals, soluble in water and hot ethyl acetate, slightly soluble in alcohol, and insoluble in ether, benzene and chloroform.

Example VII

PREPARATION OF 2-(6'-METHOXY-3'-INDOLYL)-1-BUTYLAMINE OF FORMULA I (R=C$_2$H$_5$)

To 305 mg. of the acetate, prepared according to the preceding example, in 30 cc. of water, dilute sodium hydroxide solution is added until the mixture is clearly alkaline. It is then extracted with benzene. The extracts are washed with water, dried over Na$_2$SO$_4$, and distilled to dryness under vacuum. 240 mg. of a transparent amber yellow resin consisting of the free base of 2-(6'-methoxy-3'-indolyl)-1-butylamine of Formula I (R=C$_2$H$_5$) are obtained. Yield: 93% of the theoretical yield. This product, which has not been previously described in the literature, is soluble in alcohol, benzene and methylene chloride, slightly soluble in ether, and insoluble in water. It reacts with acetone. Its infrared spectrum confirms the assumed structure.

In place of tetrahydrofuran, used as inert organic solvent in Examples II and V, there may be employed other inert organic solvents, such as ether.

In place of the picrate and the acetate, there may be produced other insoluble acid addition salts, such as salts formed from lower alkanoic acids, lower alkanedioic acids and polynitrophenolic acids and, in particular, the propionate, the butyrate, the oxalate, the tartrate, the succinate, for purifying the crude amine.

In place of ethyl or methyl magnesium iodide, used as condensation compound, there may be employed the equimolecular amount of ethyl or methyl magnesium chloride or, respectively, bromide. Otherwise the procedure is the same as that described in the preceding examples.

Example VIII

PREPARATION OF 2-(6'-METHOXY-3'-INDOLYL) PROPIONITRILE (FORMULA VII)

2.85 g. of magnesium are reacted with 20.5 g. of ethyl iodide in 32.5 cc. of anisole. After formation of ethyl magnesium iodide is completed, the solution is cooled in an ice bath and a solution of 9.5 g. of 6-methoxy indole of Formula V in 20 cc. of anisole warmed to about 40° C. is added dropwise thereto. The reaction mixture is stirred at room temperature for half an hour and is cooled to 0° C. 12 g. of α-bromo propionitrile and 10 cc. of anisole are added thereto. The mixture is stirred for 3 hours while cooling to 0° C. in the beginning. After the addition of 200 cc. of 10% aqueous acetic acid, the mixture is extracted with methylene chloride and the organic layer is washed successively with water, a solution of sodium bicarbonate, and water. Methylene chloride is distilled off in a vacuum and the remaining anisole is distilled off at a pressure of 0.2 mm. The distillation residue is a viscous product which consists substantially of 2-(6'-methoxy-3'-indolyl) propionitrile of Formula VII. It may be used as such, without further purification, in the next reaction step. The compound has not yet been described in the literature.

Example IX

PREPARATION OF THE PICRATE 2-(6'-METHOXY-3'-INDOLYL)-1-PROPYLAMINE (FORMULA I; R=CH₃)

The viscous compound obtained according to the preceding example is dissolved in 150 cc. of ethanol. 80 cc. of ethanol saturated with ammonia and 12 g. of Raney nickel are added thereto. The air in the reaction vessel is removed by first passing nitrogen and then hydrogen therethrough. The solution is subjected to the action of hydrogen for 7 hours while another 12 g. of Raney nickel were added to the mixture after 3 hours. The catalyst is filtered off and the solvent is distilled off in a vacuum. The residue is taken up with methylene chloride. The solution is extracted with 200 cc. of 10% aqueous acetic acid and then with 50 cc. of water. The aqueous extract is washed with methylene chloride and the aqueous layer is rendered alkaline by the addition of a concentrated sodium hydroxide solution. The new substituted tryptamine compound is extracted from the alkaline reaction mixture by means of methylene chloride. The organic layer is washed with a solution of sodium chloride and is evaporated to dryness. The resulting residue is dissolved in 25 cc. of ethanol. After addition of 100 cc. of an ethanolic solution of picric acid (5% picric acid), the reaction mixture is cooled. The resulting precipitate is filtered off. The well crystallized and stable picrate of 2-(6'-methoxy-3'-indolyl)-1-propylamine, I (R=CH₃), of a reddish-orange color is obtained thereby. The new compound is insoluble in ether, soluble in warm ethanol and acetone and in cold dimethylformamide. The compound has a melting point of 242° C. (with decomposition). The total yield is 20% of the theoretical yield calculated for 6-methoxy indole of Formula V.

*Analysis.*—$C_{18}H_{19}N_5O_8$; molecular weight=433.37. Calculated: C, 49.88%; H, 4.42%; N, 16.16%; O, 29.54%. Found: C, 50.0%; H, 4.5%; N, 16.0%; O, 29.4%.

This compound is identical with that prepared in Example III.

Example X

PREPARATION OF 2-(6'-METHOXY-3'-INDOLYL)-1-PROPYLAMINE, I; R=CH₃

In order to prepare the free amine of Formula I; R=CH₃, 1.5 g. of the picrate of Examples III or IX are suspended in 100 cc. of methylene chloride and 20 cc. of an 11.5% aqueous lithium hydroxide solution is added thereto. The two layers are separated and the aqueous layer is extracted with methylene chloride. The combined organic solutions are washed successively with a mixture of a saturated lithium hydroxide solution and a saturated sodium chloride solution (1:1) and with a saturated sodium chloride solution. After filtration, the organic solvent is evaporated in a vacuum. 680 mg. of 2-(6'-methoxy-3'-indolyl)-1-propylamine of Formula I (R=CH₃) are obtained in the form of a viscous oil (96% of the theoretical yield). When treated with sodium nitroprusside, violet coloration takes place, as is characteristic for primary aliphatic amines. The compound is insoluble in water, slightly soluble in ether, and soluble in alcohol, chloroform, and methylene chloride. Its infrared spectrum corresponds to the structure proposed for the compound. The compound has not yet been described in the literature.

As stated hereinabove, the new substituted tryptamine compounds according to the present invention are useful intermediates in the synthesis of physiologically active compounds of the reserpine series. For instance, the new tryptamine compounds are converted into such reserpins compounds by reaction with the dextrorotatory methyl ester of 1β-carboxyl methyl-2β-methoxy carbonyl-3α-methoxy-4β-acetoxy-6β-formyl cyclohexane in a neutral solvent. The resulting condensation product is subjected to the action of potassium borohydride in a lower alkanol and the 6-alkyl-11,17α-dimethoxy-16β-methoxy carbonyl-18β -hydroxy - 3 - oxo - 2,3 - seco - 20α - yohimbane obtained thereby is esterified in 18-position by means of 3,4,5-trimethoxy benzoic acid anhydride in the presence of a pyridine base and triethylamine. On heating said 18-ester compound in phosphorus oxychloride to cause ring closure and on reducing the resulting unsaturated quaternary ammonium compound by means of zinc in the presence of perchloric acid and in a water miscible solvent, 6-alkyl reserpine is obtained. The alkyl in the 6 position can be either ethyl or methyl. It occurs in two isomeric forms. Reserpine-like compounds can also be produced by condensing the methyl ester of 1β-carboxy methyl - 2β - methoxy carbonyl - 3α - methoxy - 4β-acetoxy-6β-formyl-cyclohexane as described by Woodward et al., J. Am. Chem. Soc. 78, 2023–5 (1956).

The substituted tryptamine compounds are of the general formula

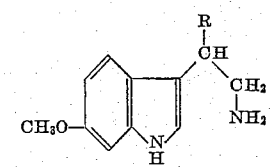

where R represents an alkyl radical selected from the group consisting of ethyl and methyl and are useful as antimetabolites.

It is known that the intestinal flora is constituted by 80% of coli bacilli and related species. The coli bacilli secrete, in the intestinal tract, an enzyme named tryptophanase which catalyzes the formation of indolic compounds from the tryptophane present in the intestinal tract according to the reaction scheme

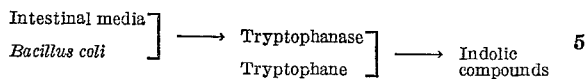

These indolic compounds are toxic and, in fact, responsible for a large number of intestinal disturbances. 2-(6'-methoxy-3'-indolyl)-1-propylamine and 2-(6'-methoxy-3'-indolyl)-1-butylamine block the tryptophanase action on tryptophane by substituting themselves (antimetabolic action). This action is distinct at a concentration of 0.1 g./liter which neither hinders the development of the coli bacilli nor at the same time modifies the intestinal flora.

The present application is a continuation-in-part of our copending United States patent applications, Serial No. 760,577, filed September 12, 1958, in the name of André Allais; Serial No. 784,847, filed January 5, 1959, in the name of André Allais; and Serial No. 797,887, filed March 9, 1959, in both our names, all now abandoned.

Of course many changes and variations in the solvents used, the basic agents employed, the reaction conditions, temperature and duration, the manner of working up and purifying the reaction products, and the like, may be made by those skilled in the art in accordance with the principles set forth herein and in the claims annexed hereto.

We claim:
1. A compound of the formula

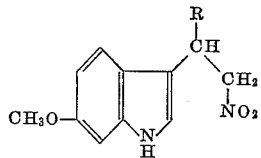

where R represents an alkyl radical selected from the group consisting of ethyl and methyl.
2. 2-(6'-methoxy-3'-indolyl)-1-nitro-butane.
3. 2-(6'-methoxy-3'-indolyl)-1-nitro-propane.
4. 2-(6'-methoxy-3'-indolyl)-propionitrile.

References Cited in the file of this patent
UNITED STATES PATENTS

| | | |
|---|---|---|
| 2,804,462 | Speeter | Aug. 27, 1957 |
| 2,814,625 | Speeter | Nov. 26, 1957 |
| 2,883,384 | Woodward | Apr. 21, 1959 |
| 2,959,591 | Petrzilka et al. | Nov. 8, 1960 |

FOREIGN PATENTS

| | | |
|---|---|---|
| 1,187,064 | France | Mar. 2, 1959 |
| 1,199,603 | France | June 22, 1959 |

OTHER REFERENCES

Abramovitch: J. Chem. Soc., page 4601 (1956).
Velluz et al.: Comptes Rendus, pages 1746–1748 (1958).

UNITED STATES PATENT OFFICE
CERTIFICATE OF CORRECTION

Patent No. 3,058,992            October 16, 1962

André Allais et al.

It is hereby certified that error appears in the above numbered patent requiring correction and that the said Letters Patent should read as corrected below.

Column 2, formula I, under TABLE I, lines 45 to 55, the formula should appear as shown below instead of as in the patent

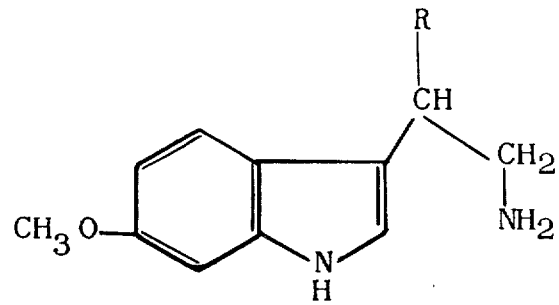

I

R=$CH_3$    or    $C_2H_5$

Signed and sealed this 30th day of April 1963.

(SEAL)
Attest:
ERNEST W. SWIDER            DAVID L. LADD
Attesting Officer            Commissioner of Patents